US010713272B1

(12) United States Patent
Caldwell et al.

(10) Patent No.: US 10,713,272 B1
(45) Date of Patent: Jul. 14, 2020

(54) DYNAMIC GENERATION OF DATA CATALOGS FOR ACCESSING DATA

(71) Applicant: Amazon Technologies, Inc., Seattle, WA (US)

(72) Inventors: Andrew Edward Caldwell, Santa Clara, CA (US); Anurag Windlass Gupta, Atherton, CA (US); Mehul Shah, Saratoga, CA (US); Prajakta Damle, San Jose, CA (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 945 days.

(21) Appl. No.: 15/199,505

(22) Filed: Jun. 30, 2016

(51) Int. Cl.
    *G06F 16/00*     (2019.01)
    *G06F 16/25*     (2019.01)
    *G06F 16/28*     (2019.01)
    *G06F 16/951*     (2019.01)
    *G06F 16/23*     (2019.01)

(52) U.S. Cl.
    CPC ........ *G06F 16/254* (2019.01); *G06F 16/2358* (2019.01); *G06F 16/283* (2019.01); *G06F 16/951* (2019.01)

(58) Field of Classification Search
CPC .................................................... G06F 16/254
USPC ........................................................ 707/602
See application file for complete search history.

(56) References Cited

U.S. PATENT DOCUMENTS

| 7,275,063 B2* | 9/2007 | Horn ....................... G06F 16/22 |
| 8,990,213 B1* | 3/2015 | Yalamanchi ........ G06F 12/0646 707/740 |
| 2009/0177671 A1 | 7/2009 | Pellegrini et al. |
| 2009/0192979 A1 | 7/2009 | Lunde |
| 2010/0274750 A1 | 10/2010 | Oltean et al. |
| 2015/0100542 A1 | 4/2015 | Li et al. |
| 2015/0113009 A1 | 4/2015 | Zhou et al. |
| 2015/0286701 A1 | 10/2015 | Wideman |
| 2015/0347541 A1 | 12/2015 | Holmes et al. |

OTHER PUBLICATIONS

Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.
Bratko, A. et al., "Exploiting Structural Information for semi-structured document categorization", Information Processing & Management, Dated May 1, 2006, vol. 42, No. 3, pp. 679-694.

(Continued)

*Primary Examiner* — Chelcie L Daye
(74) *Attorney, Agent, or Firm* — Robert C. Kowert; Kowert, Hood, Munyon, Rankin & Goetzel, P.C.

(57) ABSTRACT

Dynamic generation of data catalogs may be implemented for accessing data sets in different storage locations. Data sets may be accessed in order to extract portions of data. Structure recognition techniques may be applied to the extracted data in order to determine structural information for the data sets. The structural information may then be stored as part of a data catalog for the data sets. Requests to access the data catalog from different clients may be received and the requested structural data supplied so that the clients may access different data sets utilizing the supplied structural data. Data catalogs may be updated as changes to data sets are made.

20 Claims, 10 Drawing Sheets

(56) References Cited

OTHER PUBLICATIONS

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs-Talend Community forum", Retrieved from URL: https//www.talendforge.org/forum/viewtopic.php?id=45580, retrieved on Jan. 10, 2018, pp. 1-3.

* cited by examiner

DYNAMIC GENERATION OF DATA CATALOGS FOR ACCESSING DATA

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management. For example, different storage systems may be employed to host different sets of data. In this way, optimal locations for different data sets (or uses of data sets) may be easily obtained. However, distributing data sets across multiple locations is not without cost. As the amount of data grows and the number of storage locations used increases, the complexity for accessing the data increases, as the number of locations that must be searched for different data grows. Techniques that make the location and access of data sets stored in different locations may ease the difficulty in accessing data in such scenarios.

Figure 1:
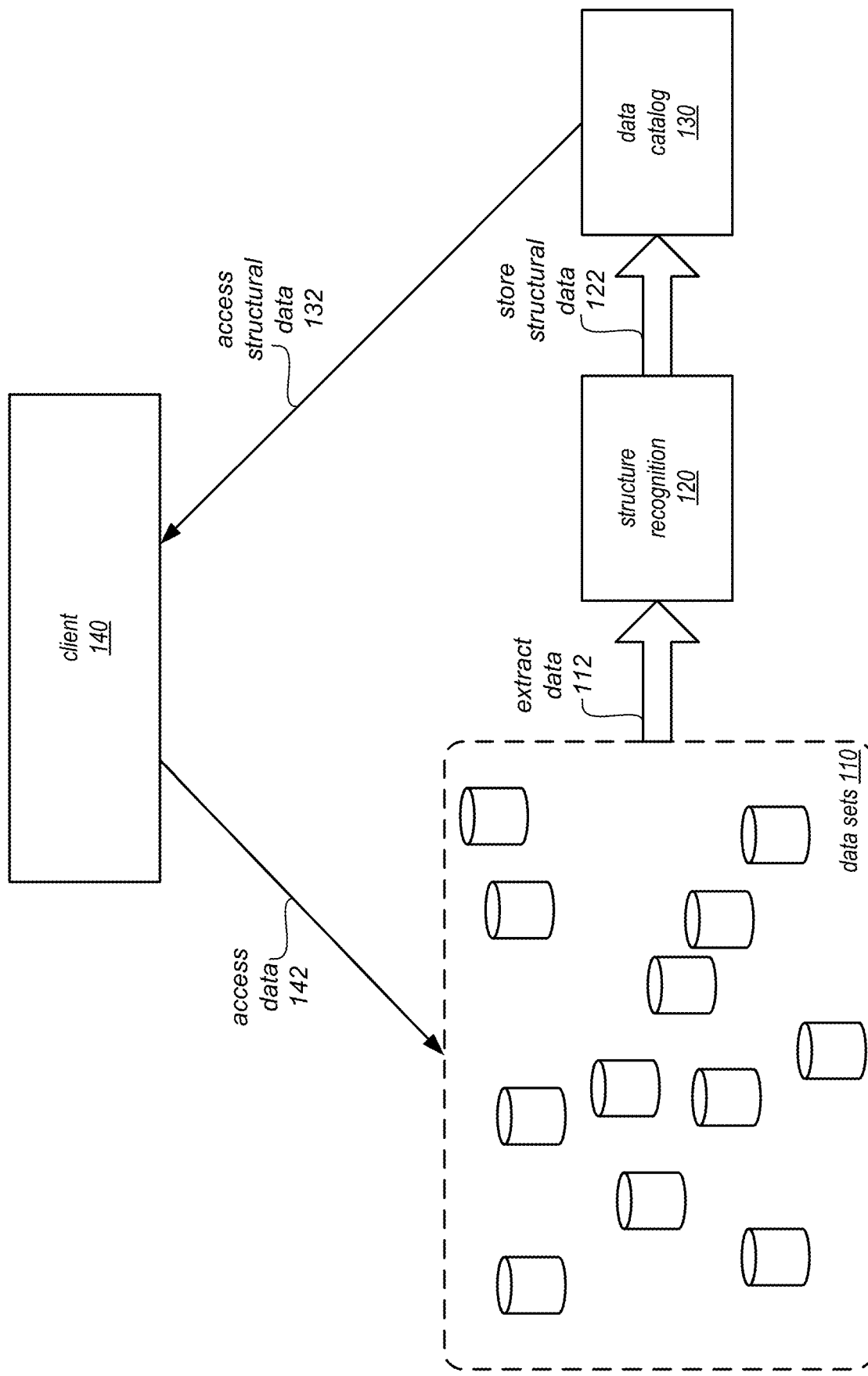
FIG. 1 illustrates a logical block diagram of dynamic generation of data catalogs for accessing data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of dynamically generating data catalogs for accessing data are described herein. Increasing numbers of storage options may make it desirable to distribute data across multiple storage platforms and services. Some data stores, for instance, may be optimized for performing analysis over large ranges of data (e.g., columnar data stores which provide for fast query processing over ranges of column data), while other data stores may be better suited for processing large numbers of operations with low-latency (e.g., some forms of non-relational data stores). Putting data in multiple different storage locations, however, is not without cost. Managing groups of data sets maintained at different storage locations can become difficult as each storage location may maintain data differently (e.g., in a different file type, data format, structured or semi structured scheme, such as relational database, non-relational databases, key value—item pairs, etc.). Typically, structural data describing the data sets are maintained along with the data sets in the various formats and including information specific to the different storage locations. The structural data may describe how the data sets may be accessed (or optimally accessed). Yet because this structural data is decentralized along with the data sets they describe attempts to manage large groups of data, including identifying what data sets should even be accessed to perform different operations can prove challenging.

Data catalogs may be dynamically generated in some embodiments to provide a centralized location for the structural data (e.g., defining schema and access information for the data sets, such as the title of the data set, a textual description of the data set, last modified date of the data set, connection information for accessing the data set, and/or table, column, partition other schema definitions). Storage locations may be discovered for different data sets and a data catalog dynamically generated based on the discovered storage locations of the data sets to include structural data for the data sets. Access to the data catalog may then be provided so that clients that wish to access the data sets can easily obtain the structural information necessary to access the data sets. Because discovery and creation of data catalogs may occur dynamically, and may include data lineage or other change tracking features to continuously update data catalogs, the management of diverse sets of data stored across a wide variety of locations may be simplified. Moreover, interaction with the data catalog may provide a centralized location for searching for desired data sets without having to manually search many different storage locations.

FIG. 1 illustrates a logical block diagram of dynamic generation of data catalogs for accessing data, according to some embodiments. Data sets 110 may include multiple different sets of data stored in different storage locations, across one or multiple storage systems (that may or may not be implemented as part of a same system, network, or service). Different data sets to be described by a data catalog may be identified (e.g., by common ownership, utilization, operation, data source, etc.). Data may then be extracted 112 from the different data sets for the application of one or more structure recognition techniques 120. For example, structure recognition techniques may identify a file or data format for a data set, the schema (or lack of schema) of the data set (e.g., number of columns, column names), data types (e.g., such as generic item types including integer, string, or floating point or specially defined data types, including gender, zip code, or animal picture) and include the determined information as structural data that is stored 122 as part of data catalog 130.

Data catalog 130 may be made available to clients, such as client 140, so that the structural data included in the data catalog 130 may be provided in response to access requests 132 for structural data from client 140. Client 140 may then access different ones of data sets 110 utilizing the structural data obtained from data catalog 130. For example, by leveraging the schema information included in data catalog 130, client 140 may select or implement a tuple reader or other storage engine capable of interpreting or interacting with one of data sets 110 (e.g., implementing a tuple reader capable of interpreting different rows and columns of data set stored in a comma separated value (CSV) format).

Moreover, as data sets may be changed or updated over time, the data catalog 130 may be updated to allow for subsequent access of data sets 110 by client 140 to adapt to the changes. Data catalogs 130 may be dynamically updated or versioned, according to various techniques discussed below with regard to FIGS. 5 and 8. For example, changes to structural data may be tracked and notifications provided to interested parties as well as updates to the data catalog performed. Consider a scenario where a data set is maintained as a set of partitions of a table, and that some of the partitions are maintained in one data format, while a newer partitioned added to the data set at a later time is maintained in a different data format. Data catalog 130 may include data lineage information for the data set indicating that the newer partition is maintained in the different data format so that client 140 may be able to access all of the different partitions, even though different formats may be implemented.

Please note that the previous description of dynamic generation of a data catalog is a logical illustration and thus is not to be construed as limiting as to the implementation of data catalog, structure recognition techniques, clients or data sets.

This specification begins with a general description of a provider network that implements a data catalog service that generates and provides access to data catalogs. Then various examples of a data catalog service including different components/modules, or arrangements of components/module that may be employed as part of implementing the data catalog service are discussed. A number of different methods and techniques to implement dynamic generation of data catalogs are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
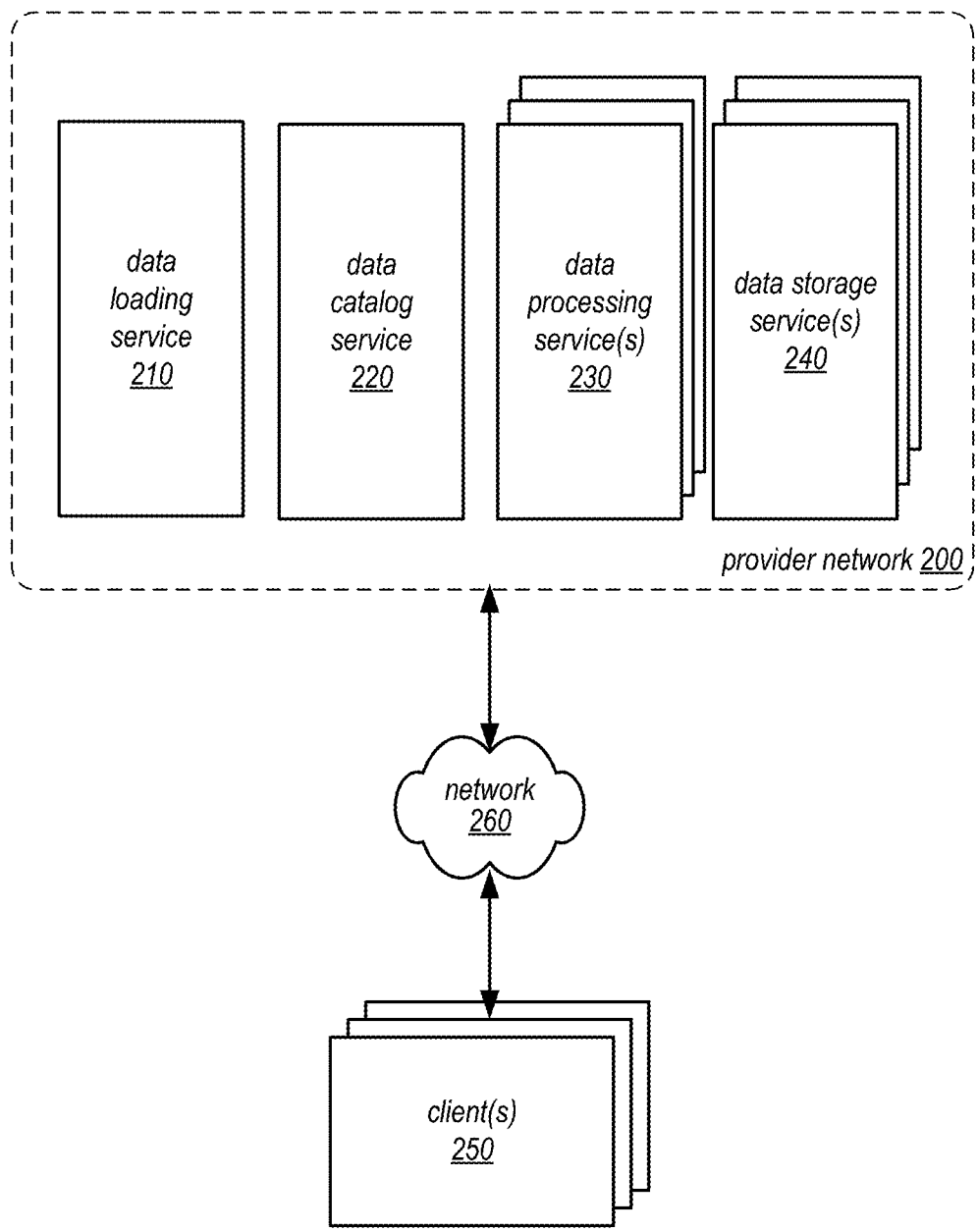
FIG. 2 is a block diagram illustrating a provider network offering data storage services that dynamically generate data catalogs for accessing data, according to some embodiments.

FIG. 2 is a block diagram illustrating a provider network offering data storage services that dynamically generate data catalogs for accessing data, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a virtual compute service, data loader service 210, data catalog services 220, data processing service(s) 230, (e.g., map reduce, data flow, and/or other large scale data processing techniques), and data storage services 240 (e.g., object storage services, block-based storage services, or data warehouse storage services), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data loading service 210 may provide extraction, transformation, and loading capabilities to place data into data sets at one or more of the various data storage service(s) 240. For example, data loading service 210 may provide clients with the resources to create, maintain, and orchestrate data loading jobs that take one or more data sets, perform various transformation operations, and store the transformed data for further processing (e.g., by one or more of data processing service(s) 230).

Data catalog service 220 may provide a catalog service that ingests, locates, and identifies data stored on behalf of clients in provider network 200 across the various data storage services 240, as discussed in detail below with regard to FIG. 3. For example, a database stored in a non-relational database format may be identified along with container storing objects in an object-based data store as both being stored on behalf of a same customer of provider network 200. In at least some embodiments, data catalog service 220 may direct the transformation of data ingested in one data format into another data format. For example, data may be ingested into a data storage service 310 as single file or semi-structured set of data (e.g., JavaScript Object Notation (JSON)). Data catalog service 220 may be configured to identify the data format of the single file or semi-structured set of data and direct the creation of a table stored in storage slabs mapped to a tree as discussed above. In at least some embodiments, the data stored in another data format may be converted to a different data format as part of a background operation (e.g., to discover the data type, column types, names, delimiters of fields, and/or any other information to construct the table of semi-structured data in order to create a structured version of the data set).

Data processing services 230 may be various types of data processing services to perform different functions (e.g., anomaly detection, machine learning, querying, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 240 (e.g., query engines processing requests for specified data). Data processing service(s) 230 may be clients of data catalog service 220 in order to obtain structural information for performing various processing operations with respect to data sets stored in data storage service(s) 240, as discussed below with regard to FIG. 4.

Data storage service(s) 240 may implement different types of data stores for storing, accessing, and managing data on behalf of clients 250 as a network-based service that enables clients 250 to operate a data storage system in a cloud or network computing environment. For example, data storage service(s) 240 may include various types of database storage services (both relational and non-relational) for storing, querying, and updating data. Such services may be enterprise-class database systems that are highly scalable and extensible. Queries may be directed to a database in data storage service(s) 240 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. Data storage service(s) 240 may also include various kinds of object or file data stores for putting, updating, and getting data objects or files. Such data storage service(s) 240 may be accessed via programmatic interfaces (e.g., APIs) or graphical user interfaces. Data storage service(s) 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI). Similar to data processing service(s) 230, in some embodiments, data storage service(s) 240 may access structural data in a data catalog maintained in data catalog service 220 in order to access data stored at one of data storage service(s) 220. For example, a storage engine implemented as part of one data storage service may access structural information maintained in data catalog service 220 in order to access and process requests with respect to a data set maintained in another one of data storage service(s) 240 (e.g., a relational database engine of a relational database service may access data objects maintained in an object data store by relying upon a table scheme determined of the data objects and maintained as part of structural data for the data objects in data catalog service 220).

In at least some embodiments, one of data storage service(s) 240 may be a data warehouse service. A data warehouse service as discussed below may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to storing data may be equally configured or adapted to implement embodiments for various other types of data storage systems and/or data storage formats, such as row-oriented database systems. Therefore, the following examples are not intended to be limiting as to various other types or formats of data storage systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a sort order may be generated and applied so that entries in the database table are stored according to the sort order. When queries are received, mapping information, such as may be maintained in a superblock as discussed below may be utilized to locate the data values likely stored in data blocks of the columnar relational database table, which may be used to determine data blocks that do not need to be read when responding to a query.

As discussed above, various clients (or customers, organizations, entities, or users) may wish to store and manage data using a data management service. Storage clusters, such as those discussed below with regard to FIGS. 3 and 6 may respond to store requests (e.g., to write data into storage) or queries for data (e.g., such as a Server Query Language request (SQL) for particular data), along with many other data management or storage services. Multiple users or clients may access a storage cluster to obtain data warehouse services. In at least some embodiments, a data warehouse service may provide network endpoints to of the clusters which allow the clients to send requests and other messages directly to a particular cluster. As noted above, network endpoints, for example may be a particular network address, such as a URL, which points to a particular cluster. For example, a client 250 may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Storage clusters hosted by the data warehouse service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Generally speaking, clients 250 may encompass any type of client configurable to submit network-based requests to provider network 200 via network 260, including requests for storage services (e.g., a request to create, read, write, obtain, or modify data in data storage service(s) 240, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
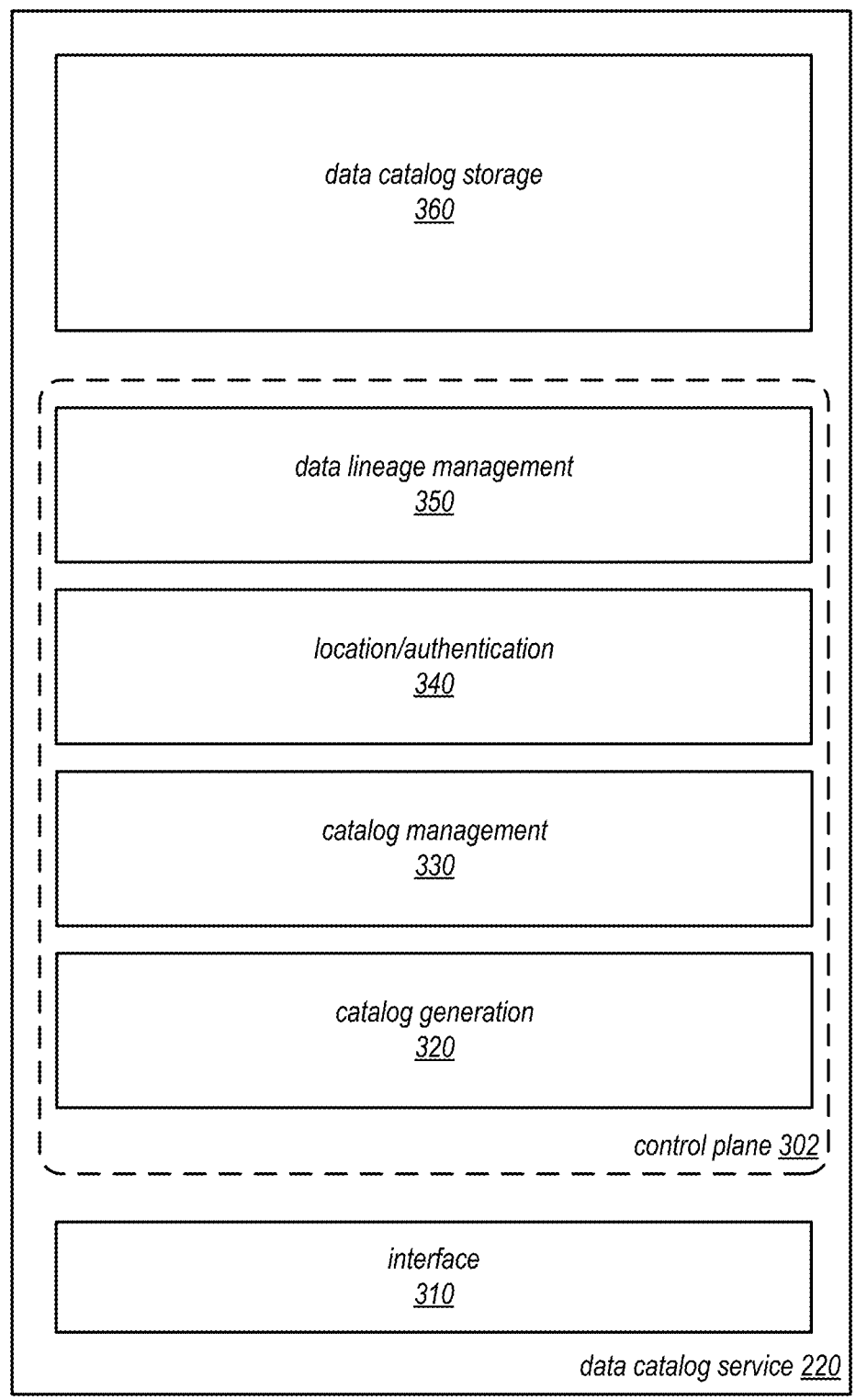
FIG. 3 is a block diagram illustrating a data catalog service that implements dynamic generation of data catalogs, according to some embodiments.

FIG. 3 is a block diagram illustrating a data catalog service that implements dynamic generation of data catalogs, according to some embodiments. Data catalog service 220 may maintain data catalogs that are dynamically generated to describe data sets (stored in provider network 200 or in external storage locations) in data catalog storage 360. Management of the data catalog service 220 may be implemented by control plane 302 (including the various illustrated functionalities). Data catalog may provide access to both data catalog storage 360 and control plane 302 via interface 310, which may be a programmatic interface, command line interface, and/or graphical user interface, in various embodiments.

Control plane 302 may implement various features and functionalities to generate, manage, update, and/or otherwise maintain data catalogs. Catalog generation 320, as discussed in detail below with regard to FIG. 4, may access data sets at multiple different storage locations to apply structure recognition techniques. The location of data sets may be determined by location/authentication 340. Location/authentication 340 may obtain identification credentials (e.g., username/password) validate them, and perform techniques to locate data sets associated with the supplied credentials. For instance, location/authentication may ping all storage services 240 to identify whether or not the storage service stores a data set associated with the validated credentials. In some embodiments, location/authentication 340 may receive a set of storage locations from a client and determine network addresses, and other information necessary to access the locations. Location/authentication 340 may provide identified storage locations to catalog generation 320 for evaluation.

Control plane 302 may implement catalog management 330 in order to allow for catalog users, owners, or other stakeholders, to modify or otherwise manage data catalogs. For instance, catalog management may allow users to combine, delete, or split tables of structural data in the catalog or edit the structural data determined for a data catalog, as discussed below with regard to FIG. 7. Catalog management 330 may implement access or control policies for data catalogs (e.g., to limit access to a data catalog to authorized users). Catalog management 330 may implement data retention or life cycle policies to determine how long data catalogs (or older versions of data catalogs as may be described by lineage tracking implemented by data lineage management 350 and discussed below with regard to FIG. 8) are maintained in data catalog storage. Catalog management 330 may handle the provisioning of storage resources in data catalog storage 360 for creating new data catalogs (e.g., providing the location of storage resources to catalog generation 320). Catalog management 330 may also perform load balancing, heat management, failure recovery, and other resource management techniques (e.g., implement durability requirements) to ensure the availability of data catalogs for clients.

Data catalog storage 360 may be implemented by one or more storage nodes, services, or computing devices (e.g., system 1000 discussed below with regard to FIG. 10) to provide persistent storage for data catalogs generated by data catalog service 200. Such storage nodes (or other storage components of storage 360) may implement various query processing engines or other request handling components to provide access to data catalogs according to requests received via interface 310 (as discussed below with regard to FIG. 4).

Figure 4:
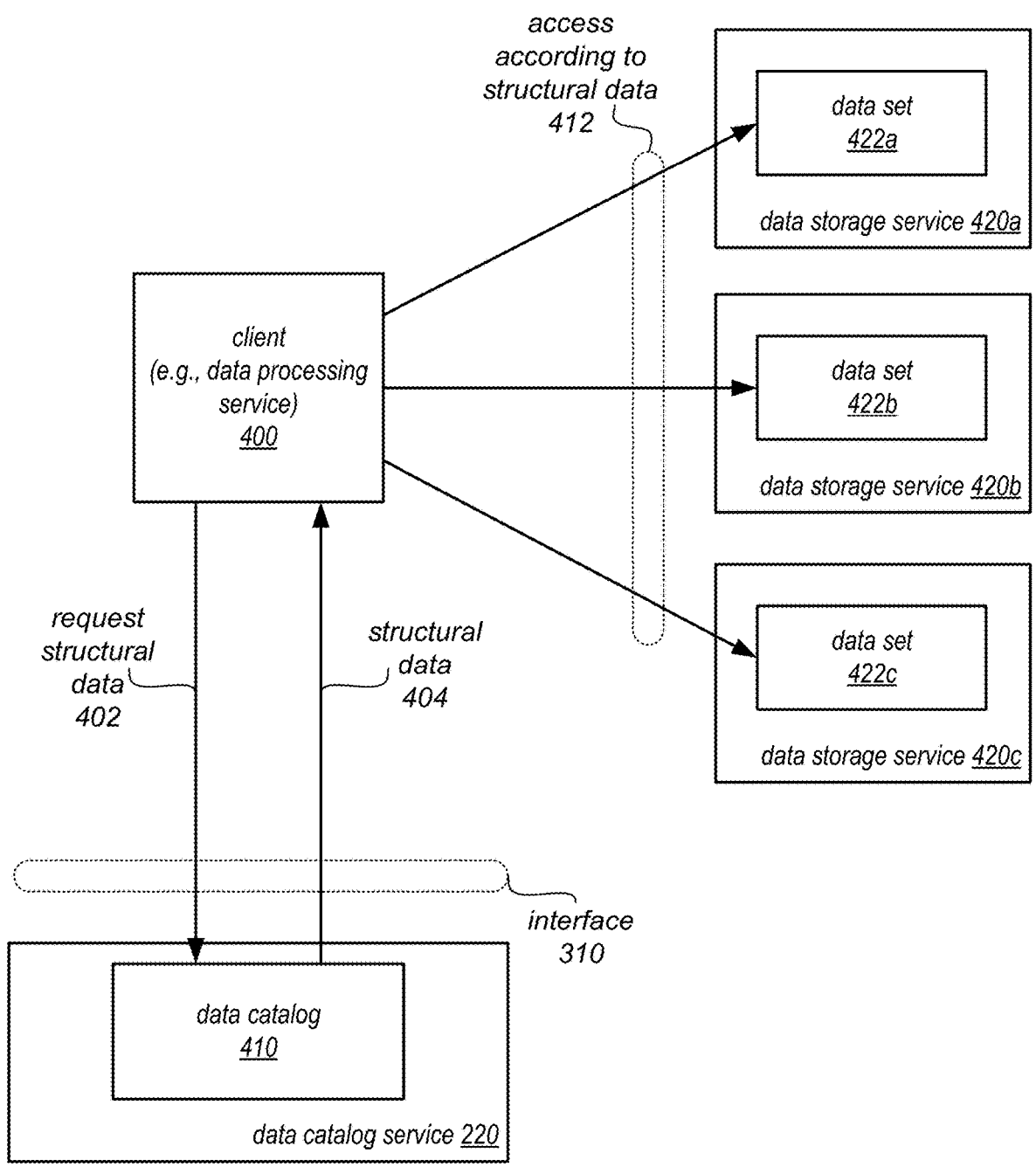
FIG. 4 is a block diagram illustrating interactions among clients, a data catalog service, and other storage services that store data sets described by a data catalog generated and maintained by the data catalog service, according to some embodiments.

FIG. 4 is a block diagram illustrating interactions among clients, a data catalog service, and other storage services that store data sets described by a data catalog generated and maintained by the data catalog service, according to some embodiments. Data catalog service 220 may dynamically generate and/or update data catalog 410 based on the various techniques discussed below with regard to FIGS. 5-9. Data catalog 410 may include structural data that describes data sets 422a, 422b, and 422c, maintained at data storage services 422a, 422b, and 422c respectively.

Client 400 may be a data processing service 230 or other client (e.g., an external system, component, or device or a system, component or device of another service implemented as part of provider network 200, such as a storage engine implemented as part of a data storage service 240) that wishes to access (e.g., operate upon one or more of data sets 422). In order to access data sets 422, client 400 may request structural data 402 via interface 310 from data catalog 410 in order to access the different data sets. For instance, returned structural data 404 may indicate that data set 422a is of a particular file type. Client 400 may then provision, launch, or execute a storage engine, tuple reader, or other components that can interpret the particular file format. By storing the structural data separate from the data set 422, client 400 can be appropriately informed as to how to access the data without having to access a data storage service 420. Client 400 can then perform various access operations 412 according to the retrieved structural data. Moreover, as the structure of data sets may change over time, updated structural data may be retrieved from data catalog 410 (e.g., prior to accessing a data set 422 or in response to receiving an event notification, such as discussed below with regard to FIG. 8).

Figure 5:
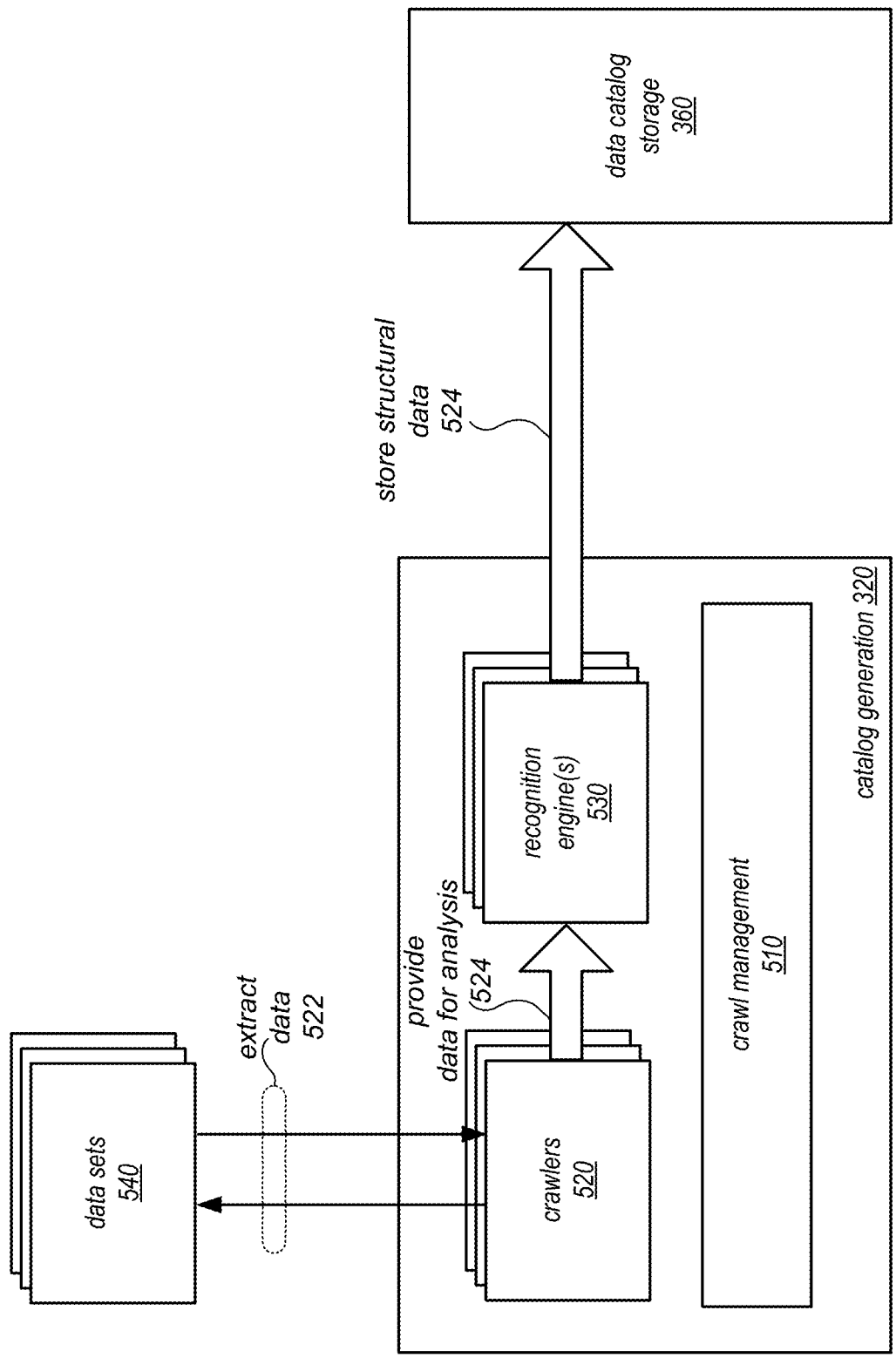
FIG. 5 is a block diagram illustrating a data catalog generator, according to some embodiments.

The generation of data catalogs may be dynamically performed for data stored within a provider network (or external to the provider network, such as on premise data storage systems for a customer of the provider network). FIG. 5 is a block diagram illustrating a data catalog generator that dynamically generates data catalogs, according to some embodiments. Catalog generation 320 may be implemented in different ways by accessing data sets identified for a data catalog in order to apply structure recognition techniques to determine structural data. For instance, as illustrated in FIG. 5, catalog generation 320 may implement crawlers 520 to extract data for the application of recognition techniques.

Catalog generation 320 may implement crawl management 510 in order to direct the efforts of crawlers. For instance, crawl management 510 may configure crawlers 520 to extract certain data from data sets that is usable for certain structure recognition techniques (e.g., header data for file metadata, how much data to extract, etc.). Crawl management 510 may obtain the appropriate authentication credentials for crawlers 520 so that crawlers 520 may access identified data sets. Crawl management 510 may assign different data sets to different crawlers 520 to distribute the crawl workload evenly. Crawl management 510 may track the progress of crawlers 520, restarting or redirecting work to other crawlers in the event of crawler failure or overload. Crawl management 510 may schedule previously crawled data sets for a new crawl (e.g., in order to update the structural data stored in a data catalog dynamically).

Crawlers 520 may be configured to access, scan, extract, or otherwise obtain data 522 from data sets 540 according to the assignments provided by crawl management 510. Crawlers 520 may utilize the appropriate access credentials to obtain access to data sets(s) and may continue to extract data from a data set until the structural data for the data set is complement. Although not illustrated in FIG. 5, in some embodiments, recognition engine(s) 530 may request particular data (e.g., directly to crawlers 520 or via crawl management 510) to be extracted. Crawlers 520 provide the extracted data 524 to recognition engine(s) 530 for analysis. Recognition engine(s) 530 implement various structure recognition techniques to determine structural data for data sets. For instance, recognition engines 530 may apply various techniques to recognize delimiters between items in a data set (e.g., commas in a CSV file, tabs, etc.), to determine file type or file format (file recognition techniques) based on data signatures or patterns located within a data set to determine data types (e.g., data type recognition techniques) such as generic data types (e.g., string, integer, floating point, etc.) or custom, special, or user specified data types (e.g., 5 character numbers that are postal codes). Recognition engine(s) 530 may apply multiple different structure recognition techniques to the data extracted from a data set, including recognition techniques uploaded or applied based on data received from a user, as discussed below with regard to FIG. 6.

Catalog generation 320 may store structural data 524 determined by recognition engine(s) 530 in data catalog storage 360. For example, different database tables may be created for each data set as part of the data catalog. In some embodiments, tables may be linked to identify related data sets or combined with tables for other data sets.

Figure 6:
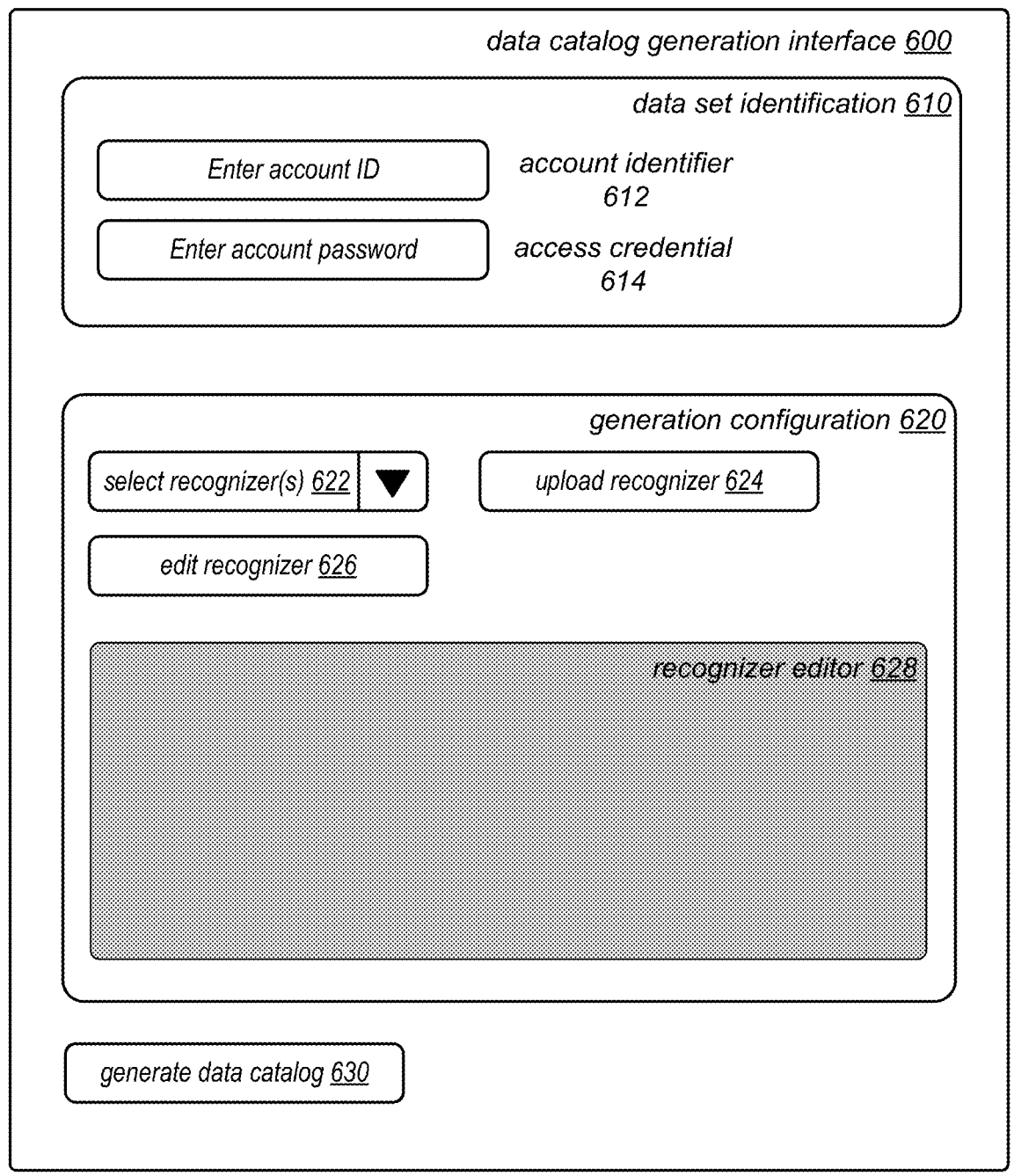
FIG. 6 is an example user interface for dynamical generating a data catalog, according to some embodiments.

FIG. 6 is an example user interface for dynamically generating a data catalog, according to some embodiments. Data catalog generation may be performed automatically, in some embodiments (e.g., when new data sets are loaded or stored, or changes to data sets are made). In at least some embodiments, a user may be able to configure the generation of a data catalog (e.g., by requesting that a data catalog be generated or determining how a data catalog is generated when it is performed automatically). In at least some embodiments, data catalog generation interface 600 may be implemented as part of interface 310 in FIG. 3 and provide a graphical interface for determining how data catalogs may be generated. Note that similar operations may be implemented via a programmatic interface or command line interface.

Data catalog generation interface 600 may implement data set identification area 610, providing various user interface elements for determining how data sets may be identified for inclusion (or exclusion) from a data catalog. For example, as illustrated in FIG. 6, text entry elements for an account identifier 612 and access credential 614, such as a password, may be implemented. In this way, data sets may be identified based on whether they are associated with the provided account identifier. Authentication may be first performed upon the provided information to determine whether access to located data sets is authorized based on the provided credentials.

Data catalog interface 600 may also implement generation configuration area 620 to provide various elements or controls for selecting, uploading, and/or modifying recognizers for structural data. For example, generation configuration 620 implements drop down box 622 to select one or more multiple recognizers for editing and/or application (e.g., one or multiple file format recognizers, data format recognizers, data type recognizers, etc.). Custom recognizers may be uploaded utilizing element 624 to be applied when generating a data catalog (e.g., allowing users to upload or enter code, programs, or executables as well as another recognizer data, such as a bit pattern or signature to be applied as part of a recognizer technique). For example, data catalog service 220 may maintain a library or repository of recognizers for users which may include uploaded recognizers that users may publish, share, or otherwise make available to other users. Recognizer editor 628 may be implemented, in various embodiments, to change the operation of a recognizer. For example, the signature, bit pattern, version number, or other data used to apply a recognition technique may be changed via the editor or the execution of the recognizer may be modified (e.g., to look in different locations for the same information). Edits may be entered textually as code changes, or may be presented with variables or options user interface elements to make changes, in some embodiments. Generate data catalog element 630 may be implemented to trigger the creation of a data catalog (or other user interface elements to save data catalog configuration information) may be implemented, in some embodiments.

Figure 7:
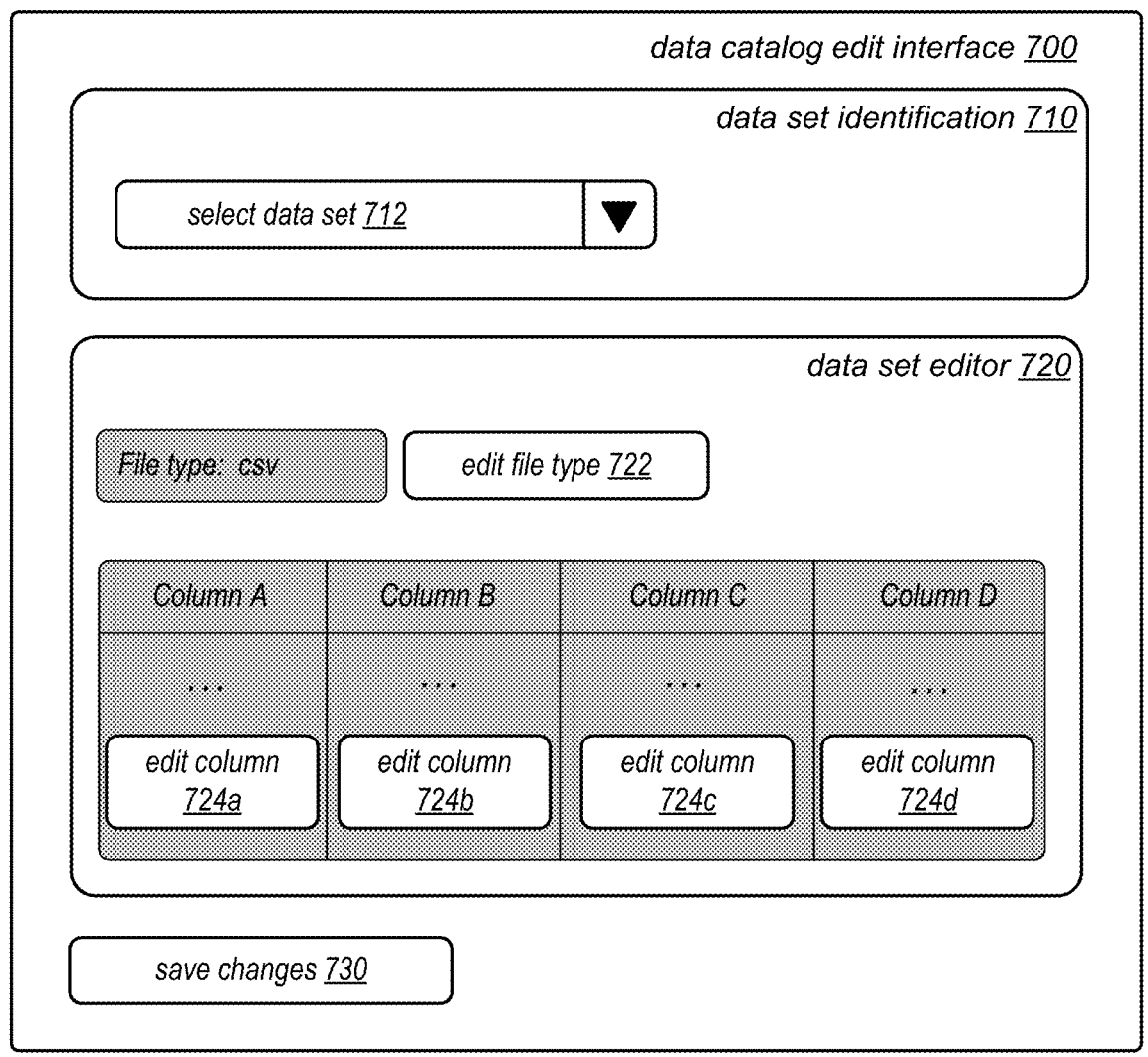
FIG. 7 is an example user interface for modifying structural data in data catalog for a data set, according to some embodiments.

FIG. 7 is an example user interface for modifying structural data in data catalog for a data set, according to some embodiments. As noted above in FIG. 3, clients may manage data catalogs. For instance, data catalog tables may be combined, altered, or deleted, updating the structural data maintained for data sets in the data catalog. As illustrated in FIG. 7, the structural data for a data set may be changed by a user (e.g., when structure recognizers make recognition errors or to further refine the structural information, such as by adding a custom data type identification).

Data catalog edit interface 700 may be implemented as part of interface 310 in FIG. 3 and provide a graphical interface for performing edits to structural data. Note that similar operations may be implemented via a programmatic interface or command line interface. Data catalog interface 700 may implement data set identification area 710 in order to provide one or more user interface elements to select the data set for which structural data is to be edit. In FIG. 7, drop down box 712 is implemented to select the data set, however, various other user interface elements may be implemented. In some embodiments, structural data may be identified by table name or other structure storing the structural data (which may contain structural data for multiple data sets).

Data catalog edit interface 700 may implement data set editor 720 to provide various features for displaying and editing structural data for the selected data set. For example, the file type (e.g., CSV) may be identified, and an element provided (button 722) to trigger steps to change the file type (e.g., a pop-up window or wizard for selecting or specifying a different file type). Similarly, information describing items or components of the data set, such as columns A, B, C, and D may be displayed, along with corresponding elements, 724a, 724b, 724c, and 724d for editing the structural data for the identified items. If, for instance, a user desired to change the data type or column name for column C, then edit column button 724c may be selected in order to trigger operations to select and/or change the data type or column name. Element 730 may be provided to submit or save the changes made to the structural data, in various embodiments.

Figure 8:
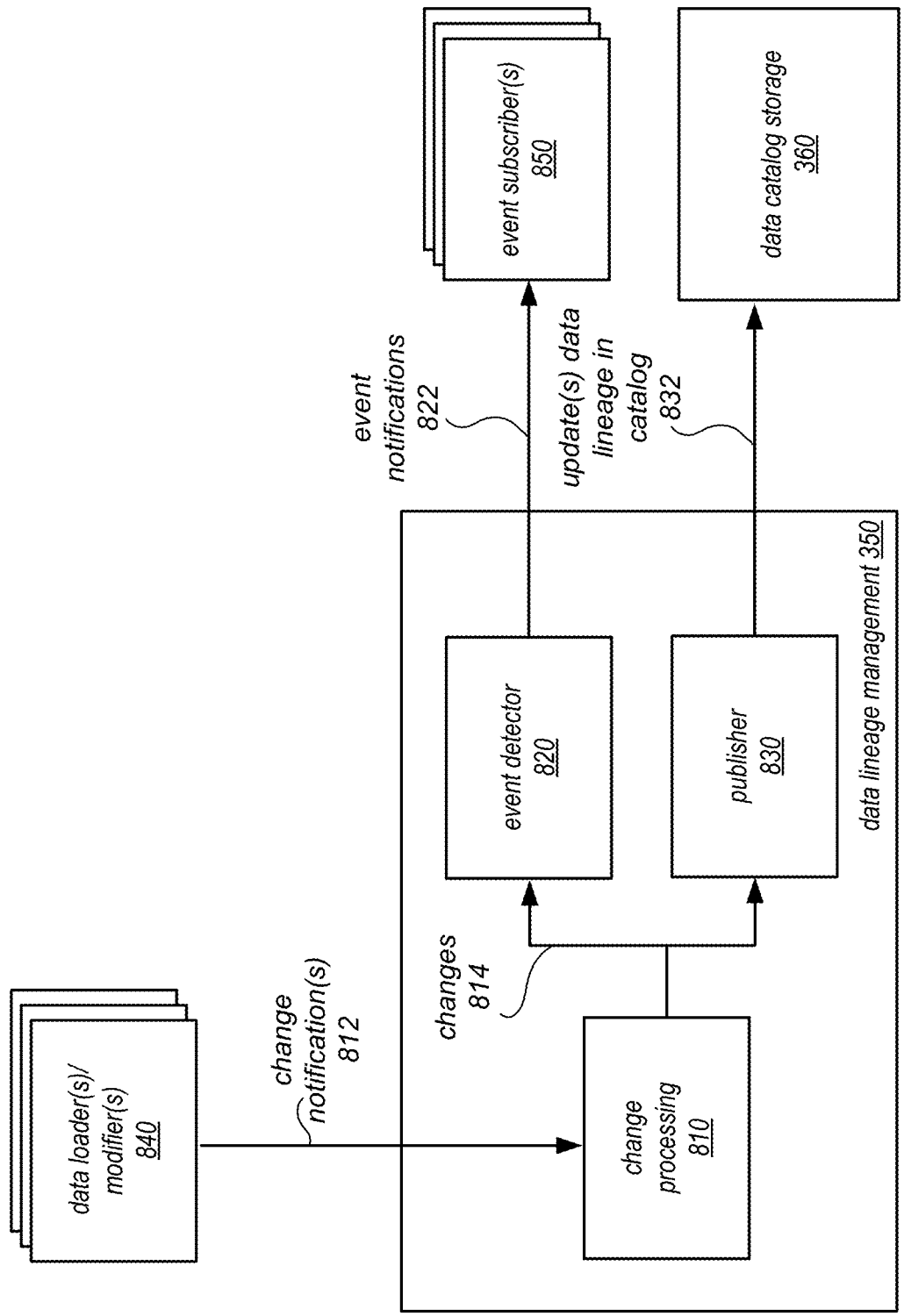
FIG. 8 is a logical block diagram illustrating data lineage tracking for data sets described in a data catalog, according to some embodiments.

FIG. 8 is a logical block diagram illustrating data lineage tracking for data sets described in a data catalog, according to some embodiments. Data lineage tracking 350 may be implemented to track, maintain, or otherwise detect changes to data sets (either to the underlying data or the structure of the data set, resulting in a change to structural data for the data set). Data lineage management 350 may implement change processing 810 to handle change notification(s) 812 sent from data loader(s) or modifier(s) 840. For example, data lineage tracking 350 may implement a programmatic interface via which change notifications 812 may be submitted. Change processing 810 may generate or forwarding change(s) 814 based on change notifications 812. In some embodiments, change processing 810 may implement a versioning schema (e.g., a tree, log, or other structure for) to describe changes to structural data for a data set or a data set itself over time. For instance, every time a change notification for a data set is received, a change or modification to a version tree for the data set may be determined. The change or modification to the version tree for the data set may be provided to publisher 830 which may perform an update 832 to the data catalog to record the modification to the version tree (e.g., by writing to a storage location that maintains the version tree).

Change processing 810 may track changes to the structural information (e.g., adding columns, changing data formats or file types, changing data types of a column, etc.). Similarly, change processing 810 may track changes to the data of data sets (e.g., the addition of new rows or items, deletion, modification of data, a new partition of a data set being created, etc.). These types of changes may, in various embodiments, trigger notification events detected by event detector 820. For example, event detector 820 may monitor for a file format change event, so that if a new partition or data is added to a data set that has a different file format, interested parties (e.g., users of the data set) may be notified. Parties interested in changes to a data set may subscribe or register interest in a data set. For example, the programmatic interface for data lineage tracking 350 may allow for event subscriber(s) 850 to register for notification for particular events for particular data sets. When the event is detected, event detector 820 may send an event notification 822 to the registered event subscriber(s) 850. Event notifications may be sent in various formats such as messages formatted according to an API, SMS destination, or email address.

Although FIG. 8 illustrates a push model for change notifications (from data loaders/modifiers 840), other implementations may allow tracker to obtain changes. For example, in some embodiments, monitors or observation agents may be installed or directed to watch for changes applied to data sets. In some embodiments, data storage services storing the data sets may directly provide change notifications to change processing 810. Crawlers, such as crawlers 520 discussed above in FIG. 5, may be implemented to revisit data sets and generate new structural data, obtaining the changes to the structural data and providing notifications of the changes to change processing 810. Therefore, the previous example of data loaders/modifiers 840 providing notifications of changes is not intended to be limiting for tracking changes.

Figure 9:
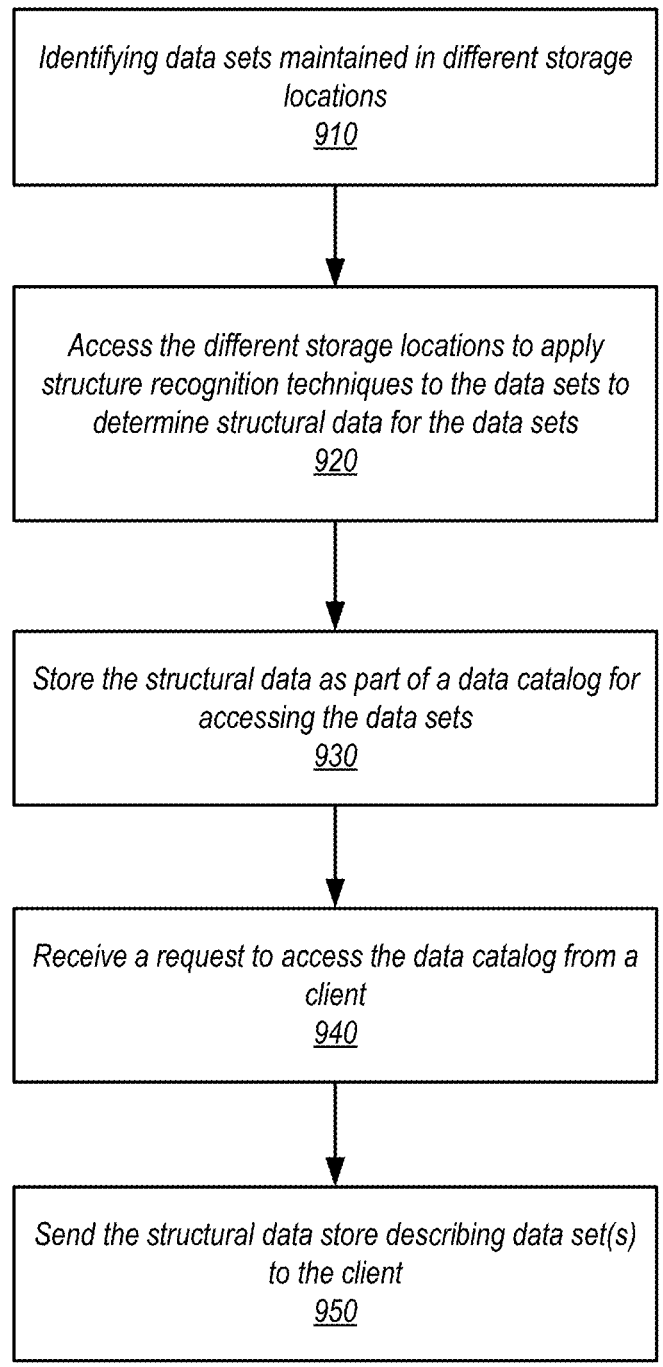
FIG. 9 is a high-level flowchart illustrating methods and techniques to implement dynamic generation of data catalogs for accessing data, according to some embodiments.

Although FIGS. 2-8 have been described and illustrated in the context of a data catalog service, the various components illustrated and described in FIGS. 2-8 may be easily applied to other data access or management systems that provide structural data for accessing data stored separate from a data catalog. As such, FIGS. 2-8 are not intended to be limiting as to other embodiments of a system that may implement dynamic generation of a data catalog for accessing data. FIG. 9 is a high-level flowchart illustrating methods and techniques to implement dynamic generation of data catalogs for accessing data, according to some embodiments. Various different systems and devices may implement the various methods and techniques described below, either singly or working together. For example, a data catalog service such as described above with regard to FIGS. 2-8 may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 910, data sets maintained in different storage locations may be identified. Data sets may be any collection of one or more data objects (e.g., data files, tables, databases, etc.) which may be maintained for access. Different storage locations may maintain the data sets because the different storage locations may offer optimal storage for the data set stored therein (e.g., database service for relational data or object storage for large data). The different storage locations may be different data storage systems or services which may be separately accessed and/or may include different data sets maintained in a same data storage system or service (which still may be separately accessible).

The identification of data sets may be performed in response to a request to generate a data catalog, as discussed above with regard to FIG. 6, or may be performed upon the detection of some data catalog generation event (e.g., a threshold amount of new data sets, a threshold number of updates to data sets, or the expiration of a period of time since the data sets were last evaluated for a data catalog). In at least some embodiments, the data sets may be associated with a same user, client, or customer account (e.g., in the case of a provider network). Authentication of a requestor may be performed before initiating the generation of the data catalog. For example, access credentials (e.g., username and password) may be evaluated to determine if the access credentials are granted access to the data sets. In some embodiments, the storage locations of the data sets may be discovered by requesting data sets associated with the user, client, or account).

As indicated at 920, the different storage locations may be accessed to apply structure recognition techniques to the data sets to determine structural data for the data sets. For example, access requests may be sent to retrieve some or all of the data stored in the data set (and/or metadata describing the data set stored in the storage location). In at least some embodiments, the storage locations may be accessed by crawling the storage locations to extract data for performing the structure recognition techniques. The identification of data sets as associated with a user, client, or account may be also be performed when crawling all or a portion of data sets maintained at a storage location.

Structural data may be any data that describes the data set such that another system component or device may access (e.g., read, write, modify, or otherwise interact with) data stored as part of the data set. For example, structural data may be considered metadata or other information that identifies the arrangement or format of data in the storage location (e.g., tabular data format, number of columns, column headers). Structural data may also include data types, such as generic data types (e.g., string, integer, or floating point number) or customized, user/client-specified, or other specially defined data types (e.g., zip codes, uniform resource locator (URL), gender, date, time, jazz audio, etc.). In some embodiments, structural data may include generic file types (e.g., log file, or database table) or specific file types (e.g., JavaScript object notation (JSON), optimized row columnar (ORC), parquet, etc.), data formats (column orient, row-oriented, semi-structured, etc.) or other information describing the data set, such as statistics used to optimize access operations (e.g., min-max values for zone maps, cardinality, and other information used by a query optimizer).

Structure recognition techniques may include various techniques to recognize delimiters between items in a data set (e.g., commas in a CSV file, tabs, etc.). For example, a frequency analysis may identify that a certain, symbol, character or bit pattern occurs between different portions of data, and thus may be the delimiter. Other structure recognition techniques to determine file type or file format (file recognition techniques) may look for data signatures or patterns located within a data set (e.g., version numbers located at particular positions in the file). Data type recognition techniques are another form of structure recognition technique that may be implemented, for example, to identify generic data types (e.g., string, integer, floating point, etc.). Data recognition techniques may also recognizes special data types (e.g., 5 character numbers that are postal codes). Multiple structure recognition techniques may be applied in hierarchical order. For example, file format or file type recognition techniques may be first applied to recognize a file type. Then data format or type recognition techniques may be applied that are commonly found or correspond to the identified file format or type may be applied. As discussed above with regard to FIG. 6, in at least some embodiments, the structure recognition techniques be uploaded, edited, and/or selected by a user (e.g., by providing structural data, such as schema information, signatures, patterns, predicates, or other information useful for identifying structural data).

As indicated at 930, the structural data determined by the structure recognition techniques may be stored as part of the data catalog, in some embodiments. Tables storing the structural data in a structured format for easy access may be created, for example. Storing the structural data in format like tables allows for quick access to particular structural information. Additionally, searches across multiple tables may be performed (e.g., joins) so that information for multiple data sets may be retrieved together. In at least some embodiments, related data sets may be identified and indicated in the data catalog based on the structural data. For example, a link, notation or other marker may be included in tables of related data sets. The structural information for related data sets may be stored together. For instance, data sets describing information (e.g., transactions, operations, requests, etc.) associated with a particular time period (e.g., a month of the year) may be identified as related (e.g., based on time period information included in the structural data or identifiable because of the structural data).

Storing the structural data for the data sets as part of the data catalog allows for a centralized location to be used when it is time to access or otherwise process the data sets. For instance, when an analysis operation that performs time intensive queries over a data set is desired, the structural information may be accessed and provided to a client configuring and/or executing the analysis operation. Locating the structural information separate from the data sets themselves may also allow for the same data to be accessed or utilized by different clients for processing. A fast reader of the same data set being operated upon by the time intensive analysis may also retrieve the structural data information and begin to perform quick read operations. Providing a data catalog that is federated, allows for multiple clients to access data and makes it easy locate an authoritative source of information for accessing data.

As indicated at 940, a request to access the data catalog may be received from a client. For instance, a programmatic interface (e.g., API) or command line interface (CLI) may be implemented that allows for queries to the data catalog. An interface may allow various requests for specific types or portions of structural data, as well as, structural data from multiple data sets. In response to receiving the request, the requested structural data describing one or more data sets may be sent to the client, as indicated at 950.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
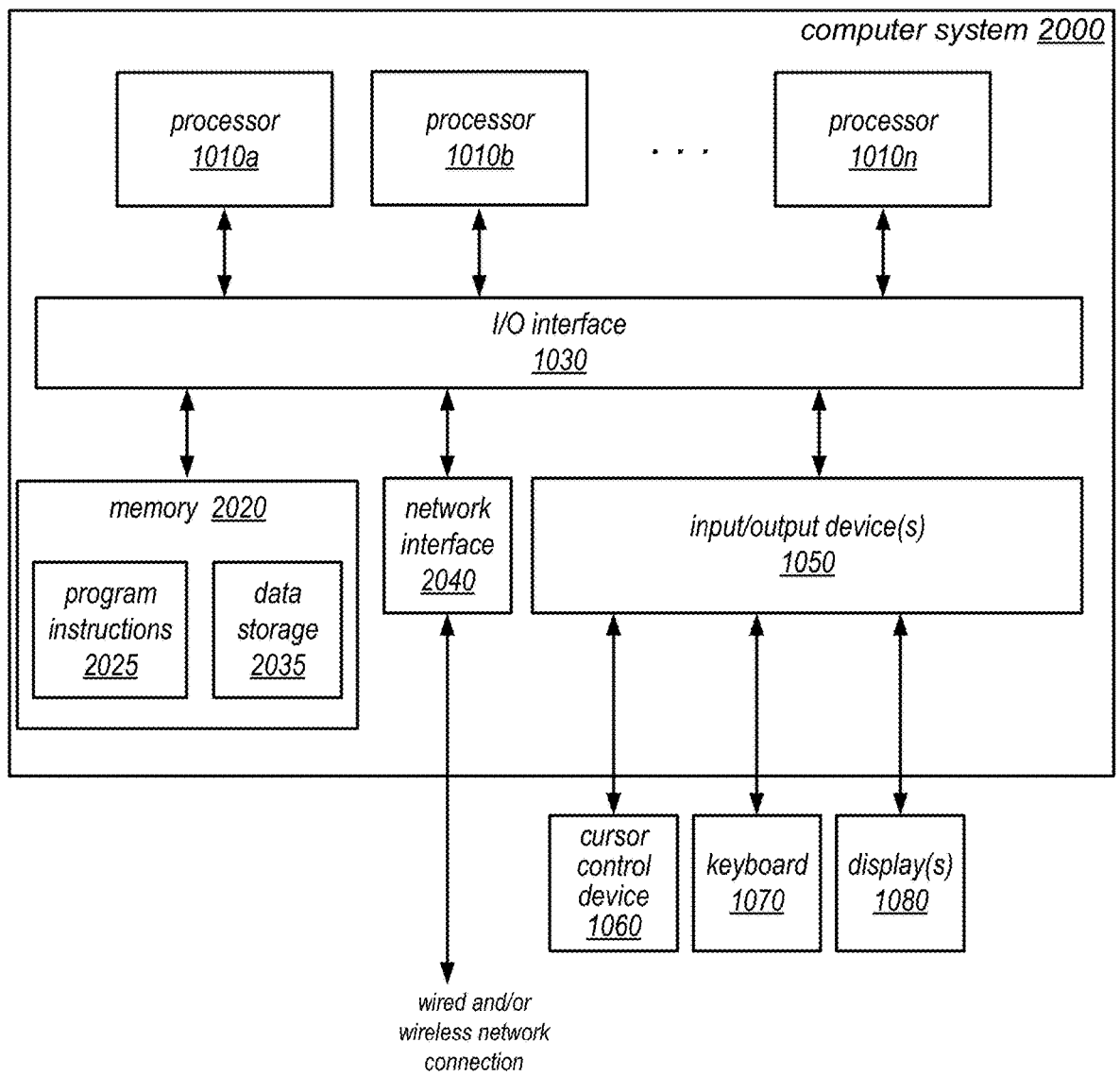
FIG. 10 illustrates an example system configured to implement the various methods, techniques, and systems described herein, according to some embodiments.

Embodiments of dynamic generation of data catalogs for accessing data as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of compute nodes of a provider network, comprising a respective processor and a memory, that implement different services of the provider network, wherein a plurality of data sets are maintained at one or more of the different services of the provider network;
   a data catalog service of the different services of the provider network, the data catalog service configured to:
      receive a request to create a data catalog for the plurality of data sets;
      in response to the receipt of the request to create the data catalog:
         locate the plurality of data sets at other ones of the different services of the provider network;
         crawl the plurality of data sets at the other different services to extract respective portions;
         apply one or more structure recognition techniques to the respective portions of the data sets to determine respective structural data for to provide to a client that makes the client capable of interpreting between different items within the plurality of data sets according respective schemas determined for the data sets when the client performs access requests to individual ones of the plurality of data sets; and
         store the respective structural data as part of the data catalog; and
      provide access to the respective structural data in the data catalog in response to one or more requests to access the data catalog.

2. The system of claim 1, wherein the one or more structure recognition techniques comprises at least one of:
   a file recognition technique to determine a file type for the data sets; or
   a data type recognition technique to determine data types for items stored in the data sets.

3. The system of claim 1, wherein the data catalog service is further configured to receive from another client, recognition data for applying one of the structure recognition techniques.

4. The system of claim 1, wherein the data catalog service is further configured to:
   track respective changes to the data sets; and
   in response to detecting an event based, at least in part, on one of the respective changes, sending an event notification to a subscriber for the event.

5. A method, comprising:
   performing, by one or more computing devices:
      identifying a plurality of data sets maintained in different storage locations;
      generating a data catalog comprising respective structural data to provide to a client that makes the client capable of interpreting between different items within the plurality of data sets according respective schemas determined for the data sets when the client performs access requests to individual ones of the plurality of data sets, the data catalog separate from the plurality of data sets, wherein the generating comprises:
         accessing the different storage locations to apply one or more structure recognition techniques to the plurality of data sets to determine the respective structural data; and
         storing the respective structural data as part of the data catalog;
      receiving, from a client, a request to access the data catalog; and
      in response to receiving the request, sending the respective structural data stored in the data catalog describing at least one of the data sets to the client.

6. The method of claim 5, wherein the one or more structure recognition techniques comprise one or more file recognition techniques to determine a file type for the data sets, wherein the file type is stored with the respective structural data as part of the data catalog.

7. The method of claim 6, wherein at least one of the structure recognition techniques or the file recognition techniques is client-specified.

8. The method of claim 5, wherein accessing the different storage locations comprises crawling the different storage locations to extract one or more portions of the data sets for application of the structural recognition techniques.

9. The method of claim 5, wherein one of the plurality of data sets is maintained in a structured data format, and wherein accessing the different storage locations comprises:

identifying the one data set maintained in the structured data format; and obtaining the respective structural data for the identified data set from the storage location.

10. The method of claim 5, further comprising:

based, at least in part, on the respective structural data, identifying a relationship between two or more of the data sets.

11. The method of claim 5, further comprising:

tracking respective changes to the data sets; and in response to detecting an event based, at least in part, on one of the respective changes, sending an event notification to a subscriber for the event.

12. The method of claim 11, wherein the event describes a change to the respective structural data for one of the data sets.

13. The method of claim 5, wherein the data sets are maintained at different storage locations implemented as part of one or more services of a provider network, wherein identifying the storage locations for the data sets comprises identifying storage locations maintaining data sets linked to a same customer account of the provider network, and wherein the client requesting the respective structural data from the data catalog is another service of the provider network.

14. A non-transitory, computer-readable storage medium, storing program instructions that when executed by one or more computing devices cause the one or more computing devices to implement:

identifying a plurality of data sets maintained in different storage locations;

crawling the different storage locations to apply one or more structure recognition techniques to the plurality of data sets to determine respective structural data for to provide to a client that makes the client capable of interpreting between different items within the plurality of data sets according respective schemas determined for the data sets when the client performs access requests to individual ones of the plurality of data sets;

storing the respective structural data as part of a data catalog separate from the plurality of data sets;

receiving, from a client, a request to access the data catalog; and in response to receiving the request, sending the respective structural data stored in the data catalog describing at least one of the data sets to the client.

15. The non-transitory, computer-readable storage medium of claim 14, wherein the one or more structure recognition techniques comprise a data type recognition technique, wherein the respective structural data comprises data type identification for one or more items in the data sets.

16. The non-transitory, computer-readable storage medium of claim 14, wherein the program instructions cause the one or more computing devices to further implement receiving, from another client, recognition data for applying one of the structure recognition techniques.

17. The non-transitory, computer-readable storage medium of claim 14, wherein at least one of the data sets is maintained in a semi-structured data format, and wherein at least another of the data sets is maintained in a structured data format.

18. The non-transitory, computer-readable storage medium of claim 14, wherein the program instructions cause the one or more computing devices to further implement:

receiving a request to modify the respective structural data for one of the data sets; and in response to receiving the request to modify the respective structural, modifying the respective structural data according to the modification request.

19. The non-transitory, computer-readable storage medium of claim 14, wherein the program instructions cause the one or more computing devices to implement:

tracking respective changes to the data sets; and in response to detecting an event based, at least in part, on one of the respective changes, sending an event notification to a subscriber for the event.

20. The non-transitory, computer-readable storage medium of claim 14, wherein the data sets are maintained at different storage locations implemented as part of one or more services of a provider network, wherein identifying the data sets, crawling the different storage locations, and storing the respective structural data is performed in response to receiving a request to create the data catalog, wherein the request indicates a customer account of the provider network, wherein the data sets linked to the customer account, and wherein the client requesting the respective structural data from the data catalog is another service of the provider network.

* * * * *